US009911130B1

(12) United States Patent
Battisti

(10) Patent No.: US 9,911,130 B1
(45) Date of Patent: Mar. 6, 2018

(54) ATTRIBUTION MODELING USING REGRESSION ANALYSIS

(71) Applicant: Amazon Technologies, Inc., Reno, NV (US)

(72) Inventor: Kyle Leon Battisti, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 452 days.

(21) Appl. No.: 14/137,385

(22) Filed: Dec. 20, 2013

(51) Int. Cl.
G06Q 30/02 (2012.01)
G06Q 30/06 (2012.01)

(52) U.S. Cl.
CPC ..... *G06Q 30/0201* (2013.01); *G06Q 30/0631* (2013.01)

(58) Field of Classification Search
CPC ............................. G06Q 30/06–30/08
USPC .................. 705/26.1–27.2; 37/26.1–27.2
See application file for complete search history.

(56) References Cited

U.S. PATENT DOCUMENTS 8,645,941 B2 * 2/2014 Goulden et al. ............... 717/170
2008/0214166 A1 * 9/2008 Ramer et al. ............... 455/414.3

OTHER PUBLICATIONS

Dette, Holger; Neumeyer, Natalie; Pilz, Kay F. A simple nonparametric estimator of a strictly monotone regression function. Bernoulli 12 (2006), No. 3, 469-490. doi:10.3150/bj/1151525131. http://projecteuclid.org/euclid.bj/1151525131.*

* cited by examiner

*Primary Examiner* — Ethan D Civan
*Assistant Examiner* — Ming Shui
(74) *Attorney, Agent, or Firm* — Davis Wright Tremaine LLP

(57) ABSTRACT

Online retailers may provider various content to the electronic commerce website such as advertisements. Content on the electronic commerce website may be optimized by assigning attribution value to the content where the attribution values correspond to the influence the content may have on a customer's decision making. The attribution values may be calculated using one or more regression models.

20 Claims, 14 Drawing Sheets

ATTRIBUTION MODELING USING REGRESSION ANALYSIS

BACKGROUND

The use of electronic commerce websites has increased in recent years, allowing online retailers to offer goods and services for sale through the electronic commerce website. A website for an online retailer may include one or more content pages for each category of items offered for order by the online retailer as well as content pages for individual items. Customers may interact with the online retailer's website via a browser executed by a computing device. Furthermore, customers of the online retailer may browse the website following any number of links or other navigational features including advertisements. When customers purchase items on the online retailer's website it may be difficult to determine the influence the content of the website may have had on the customer's decision. The online retailer may track customers' navigation of the website to determine what influence if any the content of the website had on the customer. The online retailer may attribute values to various content based on the influence the particular content had on the customer's decision making. The online retailer may then use the attributed value assigned to various content in order to determine content and placement on the online retailer's website.

BRIEF DESCRIPTION OF THE DRAWINGS

Various embodiments in accordance with the present disclosure will be described with reference to the drawings, in which.

DETAILED DESCRIPTION

Figure 1:
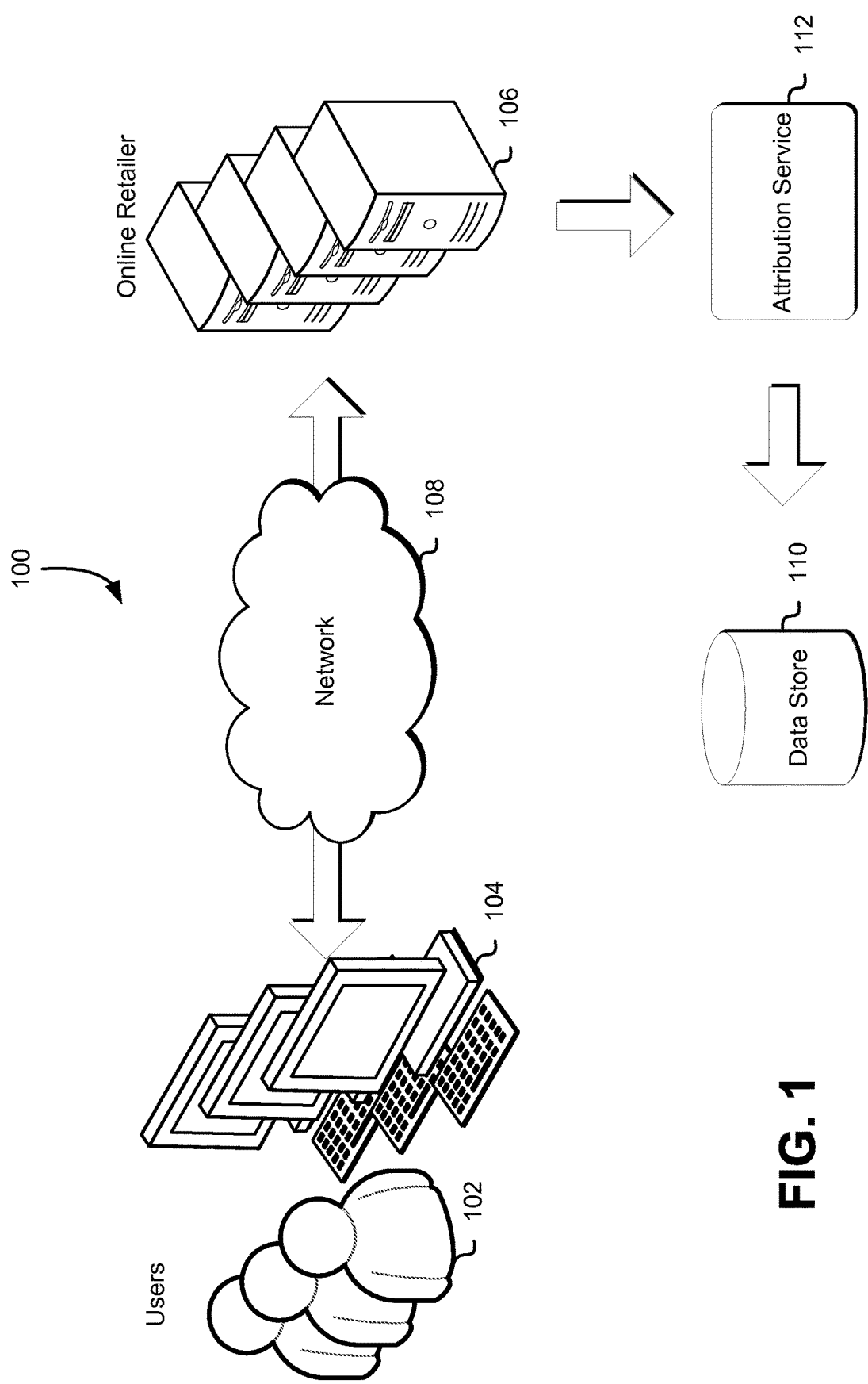
FIG. 1 shows an environment illustrating attribution in accordance with various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for attribution values assigned to content on an electronic commerce marketplace (also referred to as a website) and content delivery based at least in part on the enhanced attribution values. Attribution values may include assigning values to various website content or website features that a customer (also referred to as a user) may have interacted with prior to a success event, such as the addition of an item to an electronic shopping cart, a purchase, an addition to a saved items list, social media share or any other event the operator of the website may consider a success. Website content or website features may include navigation links, audio, video, advertisements, menus, images, words, dialog boxes, pop-up windows or any other information that may be received by a web browser. As described herein, website content or website features may be referred to simply as content. Furthermore a website may include other means of displaying content on a computing device of the user such as a mobile application, standalone application or other application capable of displaying content.

Content may be assigned an attribution value, where the attribution value may correspond to the influence the content may have had on the user's decision making. In some instances, the attribution value may not reflect the incremental effects of the content. For example, different content may have had the same influence on the user's decision and the resulting success event may have been the same had different content been presented to the user. There are a variety of different attribution models which may be used for assigning attribution values to content. Example attribution models may include last interaction, last non-direct click, last advertisement, first interaction, linear, position based or any other model suitable for assigning value to a user's interactions with a website. A last interaction attribution model assigns all of the attributed value to the last click performed by a user before the success event. A last non-direct click attribution model assigns all of the attributed value to the last click that does not lead directly to the webpage where the success event occurred. The last advertisement attribution model assigns all of the attributed value to the last advertisement clicked on by the user before the success event. A first interaction attribution model assigns all of the attributed value to the user's first interaction with the website. A linear attribution model divides the attributed values equally between all the user's clicks leading up to the success event. A position-based attribution model is a hybrid between first interaction and last interaction splitting the attributed value evenly between the user's first and last interactions.

One or more regression models may also be used to assign attribution values to content. The one or more regression models used may be any regression model such as linear regression, percentage regression, least absolute deviations, non-parametric regression, linear and non-linear least squares regression, Bayesian linear regression, polynomial regression or any other suitable form of regression analysis. Once assigned, the attribution values may be used to track the performance of content, as an input for content selection or optimization, to determine the effectiveness of content, to evaluate one or more other attribution models or for any other use suitable for managing content. Attribution values may be calculated from clickstream data collected as the user interacts with content that is part of the online retailer's website. Clickstream data may be collected over a period of time and used as input data for the one or more regression models used to assign attribution values to content. For each success event, a point value may be assigned to each eligible content hit, the point value assigned may then be expressed as a percentage of the total number of points associated with the success event and multiplied by the total value of the success event in order to determine an attributed value.

Accordingly, FIG. 1 shows an example of an environment that includes an attribution service in accordance with the present disclosure. Users 102 operate computing devices 104 which may be connected over a network 108 to an online retailer 106. Each computing device 104 may be any suitable computing device such as a desktop, laptop, smartphone, tablet, electronic book reader, smart watch or other smart accessory (e.g., glasses) or any other device capable of interacting with an online retailer. The users 102 may interact with the online retailer using a web browser or other application executed by the computing device 104. The network 108 may be any suitable network such as the Internet, a local area network, wide area network or any other suitable communications network. To enable the user 102 to interact with the online retailer 106, the computing device 104 may transmit one or more Hypertext Transfer Protocol (HTTP) requests over the network 108 to one or more web servers operated by the online retailer 106. The web servers may be responsible for delivering the website and associated content to the users 102 through computing devices 104 in response to the one or more HTTP requests received over the network 108.

The online retailer 106 may operate one or more other services in order to optimize and select content to be displayed on their website, to be described in greater detail below in reference to FIG. 4. The online retailer 106 may also collect users' interactions with the website and content by capturing a clickstream corresponding to the users' 102 inputs into the computing devices 104. Clickstream data may be captured by the online retailer and stored in one or more storage systems for use with the attribution service 112. The attribution service 112 may analyze the clickstream data contemporaneously or near contemporaneously with storage of the clickstream data. The clickstream data may also be captured over a period of time and stored enabling the attribution service 112 to analyze content performance over the period of time the data was captured. For example, users' 102 interaction with the website and content may be captured over a period of 30 days at the end of which the attribution service 112 may be used to determine attribution values for various content displayed on the website. This information may be stored in a data store 110 and used to update one or more other services, such as a content delivery service.

Figure 2:
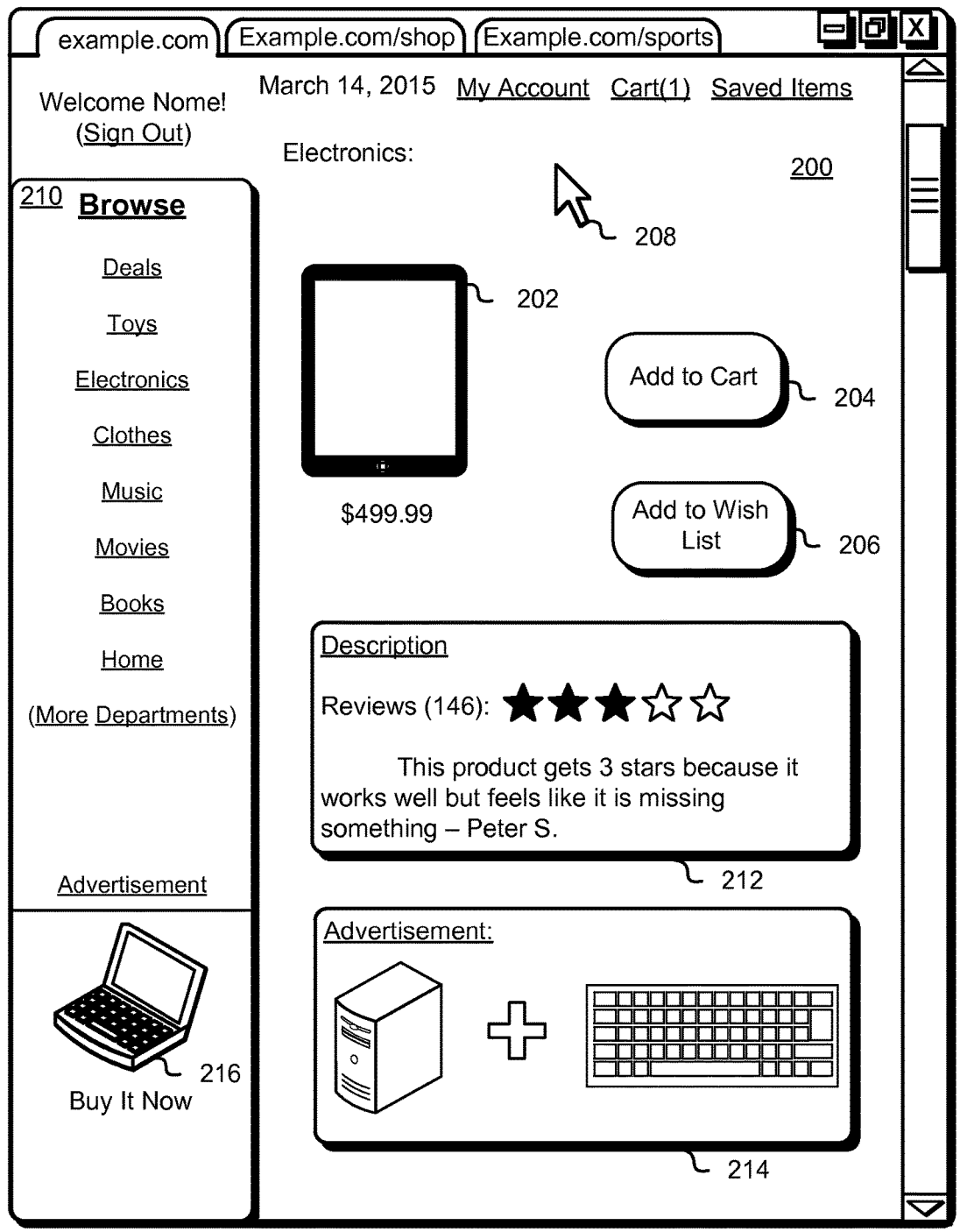
FIG. 2 shows a diagram illustrating in accordance with various aspects of the present disclosure.

As illustrated in FIG. 2, the webpage 200 includes various graphical user interface elements that enable navigation throughout a website of which the webpage 200 is a part. The webpage 200 may be displayed by various applications, such as a mobile application or web browser. In this example, the webpage 200 is part of an electronic marketplace of an online retailer providing goods and services as well as advertisements and other content. For instance, on the left-hand side of the webpage 200, various links 210 may link to one or more other webpages that contain additional content corresponding to department pages and/or category pages. In this example, the links appear as textual words which enable the links to be selected using an appropriate input device such as a keyboard, mouse, touchscreen or other input device. Selection of one of the links 210 may cause an application displaying the webpage 200 to submit, pursuant to a URL associated with the selected link by the programming of the webpage 200, an HTTP request for the content associated with the link to a server that provided the webpage 200 or another server. In this example, the webpage 200 also includes a graphical user element configured as an "add to cart" button 204. The add to cart button 204 may be a graphical user interface element of the webpage 200 where the underlying code of the webpage 200 is configured such that selection by an input device of the add to cart button 204 causes information corresponding to the item offered for sale 202 on the particular webpage 200 to be placed in the user's electronic shopping cart (which may also be referred to as simply a "shopping cart").

The webpage 200 further includes a graphical user element configured as an "add to saved items list" button 206. The add to saved items list button 206 may be a graphical user interface element of the webpage 200 where the underlying code of the webpage 200 is configured such that selection by an input device of the add to saved items list button 206 causes information corresponding to the item offered for sale 202 on the particular webpage 200 to be placed in the user's saved items list. The saved items list may be a list of items maintained by the online retailer which may be accessed by others so that the items on the list may be purchased for the user responsible for creating the saved items list. The user responsible for creating the saved items list may define one or more permissions for the saved items list containing information corresponding to other users that may access the list. The selection of links and graphical user interface elements of the webpage 200 may be done through the use of a cursor 208 and/or associated input device such as a mouse, touchpad or touchscreen. Using the cursor 208 to select links and graphical user interface elements is also referred to as a click. The user clicks generated as the user navigates the website may be recorded as a clickstream and stored in the server that provided the webpage 200 or another server. The clickstream data may then be used by the attribution service in order to attribute value to the various user clicks.

The webpage 200 may also contain advertisements 216 and 214. The advertisements may be displayed in various locations on the webpage 200 and the various locations may have prominence on the webpage 200. For example, advertisement 214 may be in a position that is specified as more prominent than the position of advertisement 216, advertisement 214 is in the center panel of the webpage 200 and is larger than the advertisement 216. Content with a higher attribution value may be placed, by the content delivery service, in a position of prominence on the webpage 200 more often than content with a lower attribution value. The webpage 200 may also contain content specific to the item offered for consumption (e.g., sale) 202 such as an item description or reviews 212. The advertisements 216 and 214 as well as the reviews 212 may be links and/or graphical user interface elements which the user may select. Selection of the advertisements 216 and/or the reviews 212 may cause the content of webpage 200 to be altered or may direct the user to one or more other webpages of the website. For example, selection of the review 212 by the user may cause a web browser displaying webpage 200 to expand the review 212 panel such that more of the review is shown. Whereas selection of advertisement 216 by the user may cause the application of the webpage 200 to be displayed, to submit, pursuant to a URL associated with the selected link by the programming of the webpage 200, an HTTP request to a server that provided the webpage 200 or another server. All of the user's interactions with the webpage 200 and any other interactions with subsequent webpages may be captured as a clickstream and stored.

Figure 3:
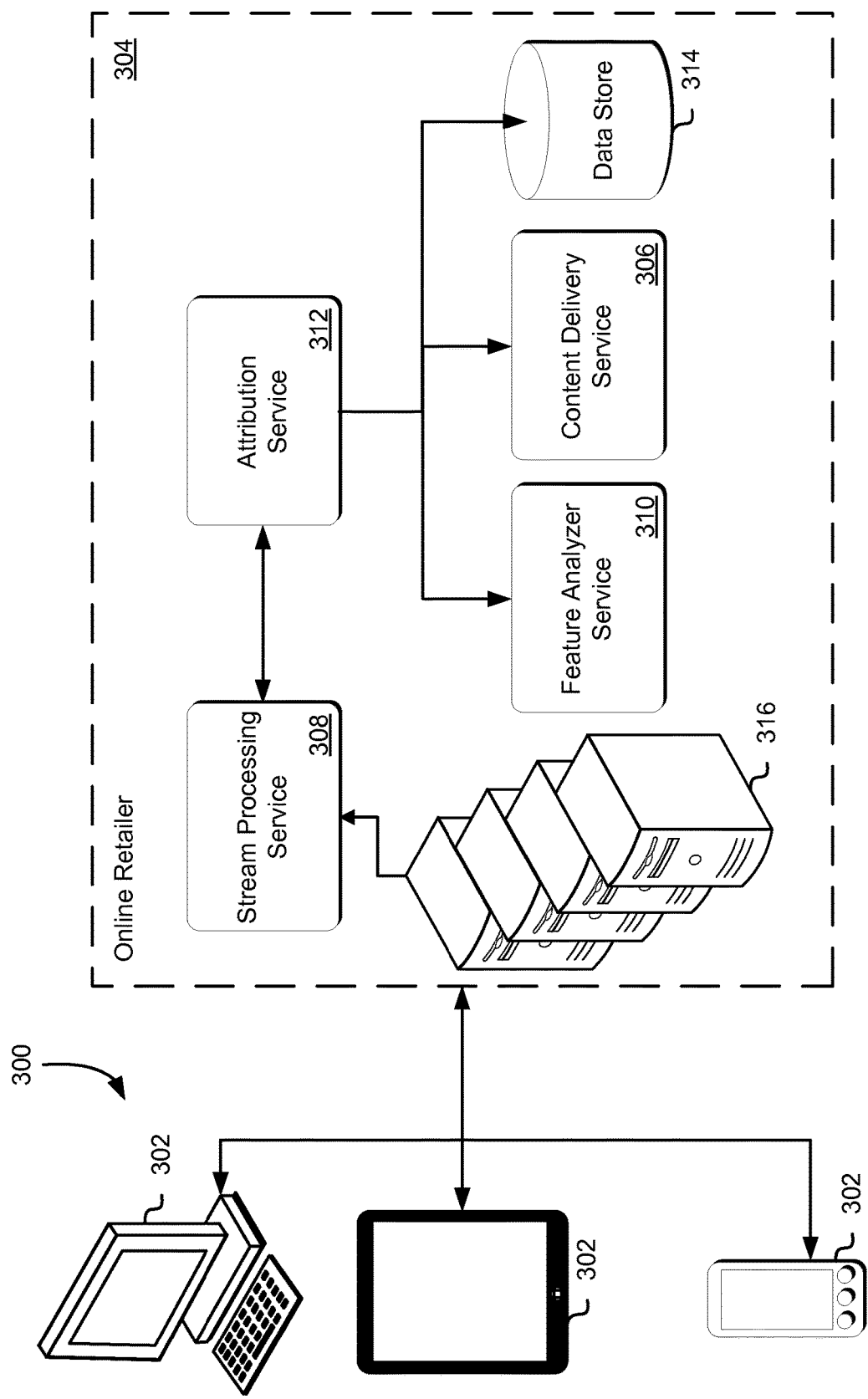
FIG. 3 shows an environment illustrating content delivery in accordance with various aspects of the present disclosure.

FIG. 3 shows an environment 300 in which customers 302 may connect to one or more servers 316 operated by an online retailer. The one or more servers 316 may be used to provide an electronic commerce website accessible to the customers 302. Each customer 302 may access the electronic commerce website through a variety of devices as illustrated in FIG. 3, such as a smartphone, tablet, personal computer or other device. When accessing the electronic commerce website, the customers 302 may navigate through a variety of content by clicking on the specific content. Some or all of the customers' 302 interactions with the electronic commerce website may be collected by the one or more servers 316 as clickstream data and transmitted to the stream processing service 308. The stream processing service 308 may be a computer system comprising one or more computing devices configured such that the system collects, organizes, stores and makes available to one or more other systems or services of the online retailer data corresponding to customers' interaction with the online retailer, such as clickstream data. The stream processing service 308 may collect and store clickstream (also referred to as a click path) data for use with the attribution service 312. In various embodiments, the stream processing service 308 or other services are responsible for organizing the clickstream data for use as static inputs into the attribution service 312. The stream processing service 308 may organize the clickstream data by grouping eligible hits with the corresponding success events. For example, a cart-add event may be grouped with one or more prior click events so that the attribution service 312 may attribute a value to the one or more prior click events. An eligible hit may include information corresponding to customer clicking on (e.g. selecting) content displayed on a webpage provided by the online retailer. For example, an eligible hit may correspond to the customer clicking on an advertisement displayed on a webpage that is part of the online retailer's website.

The content delivery service 306 may be a computer system comprising one or more computing devices configured such that the system is configured to render and deliver content for the online retailer's website. The content delivery service 306 may determine the content to be displayed on the electronic commerce website and the placement of the content on the electronic commerce website. The content delivery service 306 may display content with a higher attributed value, as determined by the attribution service 312, more prominently on the electronic commerce website than content with a lower attributed value. The content delivery service may use one or more algorithms to determine placement of content on the electronic commerce website. The content delivery service may contain one or more other services to be described in detail in connection with FIG. 4.

The attribution service 312 may be a computer system comprising one or more computing devices configured such that the system is configured to assign attribution values to various content of the online retailer's website. The attribution service 312 may receive as input, information corresponding to the clickstream data collected by the stream processing service 308. The attribution service 312 may receive the clickstream data in native format from the stream processing service 308. The attribution service may request the clickstream data from the stream processing service 308 using an appropriately configured application program interface (API) call. For example, the attribution service 312 may request, from the stream processing service 308, all the clickstream data from the previous twenty one days. The attribution service 312 may then determine, based at least in part on the clickstream data received from stream processing service 308, a set of success events and associated eligible hits. The set of success events and associated eligible hits may be used, by the attribution service 312, as inputs into one or more regression models. The attribution service may, based at least in part on the coefficients from the one or more regression models, for each success event, assign a point value to each eligible hit, which is then expressed as a percentage of the success event's total attributed points and multiplied by the success event's total attributed value in order to determine the final attributed value for a particular eligible hit. The success event's total attributed value may be the resultant value to the online retailer of the success event. For example, customer 302 may, through the electronic commerce website operated by the online retailer 304, add an item offered for sale to their cart. The customer 302 may purchase the item added to their cart for one hundred dollars, the dollar value may be considered the success event's total attributed value (e.g. the value of the success event to the online retailer). This formation may be captured by the stream processing service 308 as well as all the eligible hits prior to the cart-add. The attribution service 312 may assign a percentage value to each eligible hit based at least in part on the one or more regression models and this percentage may be multiplied by the success event's total attributed value (one hundred dollars in this example).

The result of multiplying the attributed percentage for each eligible hit by the success event's total attributed value, in an embodiment, is the attributed value for the particular eligible hit. The attribution service may determine the attributed value for all the eligible hits received from the stream processing service 308. Once the attributed value has been calculated, the attribution service 312 may store the attributed value in a data store 314. The data store 314 may contain the attributed value for each eligible hit, the one or more regression models used to determine the attributed value, the success event's total attributed value and any other information suitable for assigning value to the customers' 302 interaction with the electronic commerce website. The information in the data store may be used by the content delivery service 306 and the feature analyzer 310.

The feature analyzer 310 may provide one or more content providers with a means for evaluating the effectiveness of the content on the electronic commerce website. The content provider may be the customers 302, the online retailer 304, advertiser, product manufacturers, product distributer, brick and mortar retailers, service providers, content provider, content generators or any other entity capable of generating content for an electronic commerce website. The feature analyzer 310 may display eligible hits and the associated attributed value. The feature analyzer 310 may also provide a management console for content providers to select content to modify. For example, a content provider may, through the feature analyzer 310, examine the attributed value for content generated by the content provider. Based at least in part on the information displayed by the feature analyzer 310 the content provider may remove under-performing content from the electronic commerce website or may increase the use of content which has a high attributed value. For example, a product manufacturer may advertise items for sale using a variety of different content on the electronic content website, such as images and text.

The attribution service 312 may determine an attributed value for each piece of content the product manufacturer uses to advertise on the electronic commerce website. This information may be retrieved from data store 314 by the feature analyzer 310 and displayed to the product manufacturer through a management console. The product manufacturer may then select content to remove from the electronic commerce website and/or select content to increase prominence.

Figure 4:
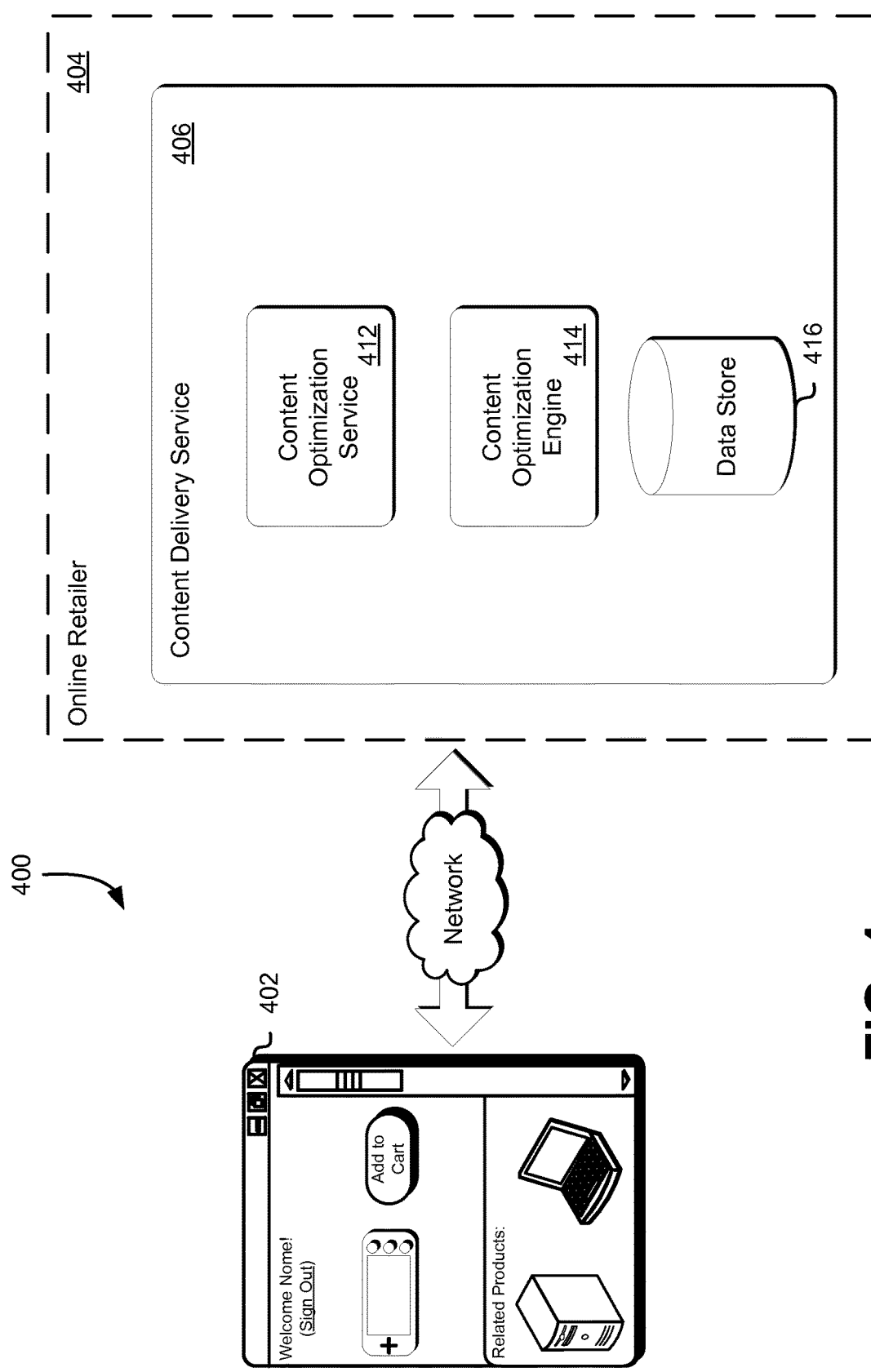
FIG. 4 shows an environment illustrating content delivery in accordance with various aspects of the present disclosure.

FIG. 4 shows an environment 400 in which content for an electronic commerce website is selected for display on a webpage 402 by a content delivery service 406 operated by an online retailer 404. The content delivery service 406 may use one or more other services to deliver content for the webpage 402, such as a content optimization service 412 or content optimization engine 414. The content delivery service 406 may also contain a data store 416 for storing content and attribution values associated with the content. The content delivery service may receive API requests from one or more web servers requesting content to be used for the webpage 402.

The content optimization service 412 may be used to render and deliver content to one or more servers or services of the online retailer 404. The content optimization service 412 may deliver content to websites, mobile platforms, email advertisements or embedded devices. The content optimization service 412 may use one or more algorithms to select content to render and deliver. For example, the content optimization service 412 may use a king of the hill algorithm to determine optimal content for the webpage 402.

The content optimization engine 414 may be used to optimize the content rendered and delivered by the content optimization service 412. The content optimization engine 414 may gather and/or generate metrics data for use by the content optimization service 412 such as in the one or more algorithms used to select content to be rendered and delivered. For example, the content optimization engine 414 may gather the attribution values of various contents from the attribution service. This information may then be provided to the content optimization service 412 for use in the one or more algorithms used to select content. The content optimization engine 414 may also generate metrics associated with the placement of content on the webpage 402. Furthermore, the content optimization engine 414 may also purge poorly performing content and promote highly-performant content.

Figure 5:
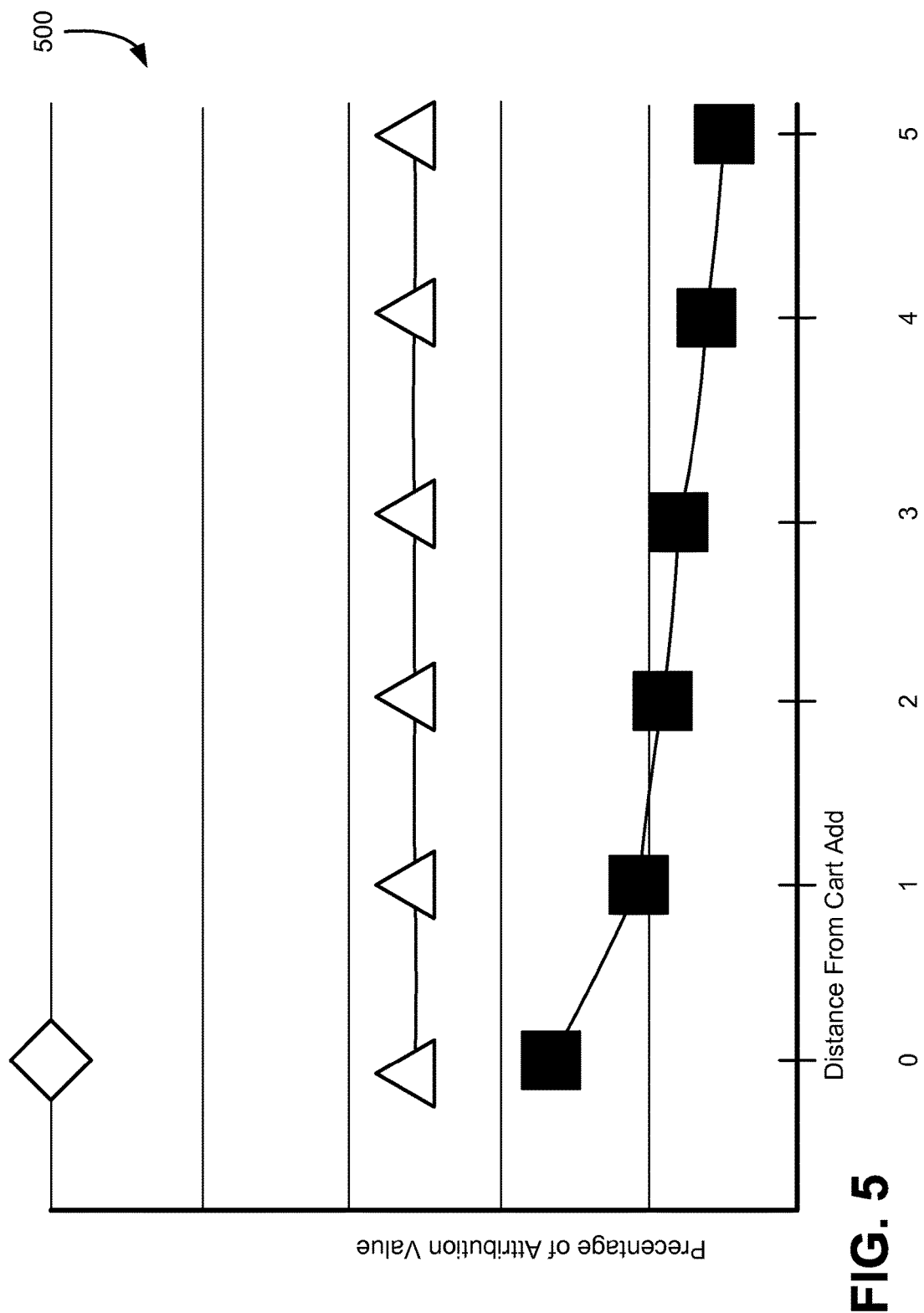
FIG. 5 shows a diagram illustration attribution analysis in accordance with various aspects of the present disclosure.

FIG. 5 shows a graphical representation 500 illustrating various attribution models that may be used to assign attribution values to eligible hits in accordance with various aspects of the present disclosure. The various attribution models include first interaction, last interaction, last non-direct interaction, last advertisement interactions, linear, time decay model, position based, statistical models, polynomial regression models or any other model suitable for assigning value to user interactions with a website. One or more systems of the online retailer may assign value to eligible hits such as the attribution service. Success events and associated eligible hits may be grouped into groups referred to as hit classifications. For example, the stream processing service or one or more other services may determine a cart-add event and group all previous user clicks leading up to the cart-add event into a group. Various other methods to group eligible hits may be used in accordance with the present disclosure, such as grouping eligible hits based on their content. For example, all the eligible hits for a particular advertisement may be grouped together into a hit classification.

The percentage of the total attributed value of each eligible hit, given m distinct hit classifications, may then be determined such that the value from a success event happening after hit n can be attributed to any prior hit X as follows:

$$X_i = \text{Total Value} * \frac{\sum_{C=1}^{m}(\omega_{Ci} * 1_C(X_i))}{\sum_{j=1}^{n}\sum_{C=1}^{m}(\omega_{Cj} * 1_C(X_j))}$$

Where both m and n are positive integer values and the total value is equal to the total value added due to the success event such as the value of the item purchased. The objective of this analysis may be to determine what value for omega is at each point $X_i$.

Figure 6:
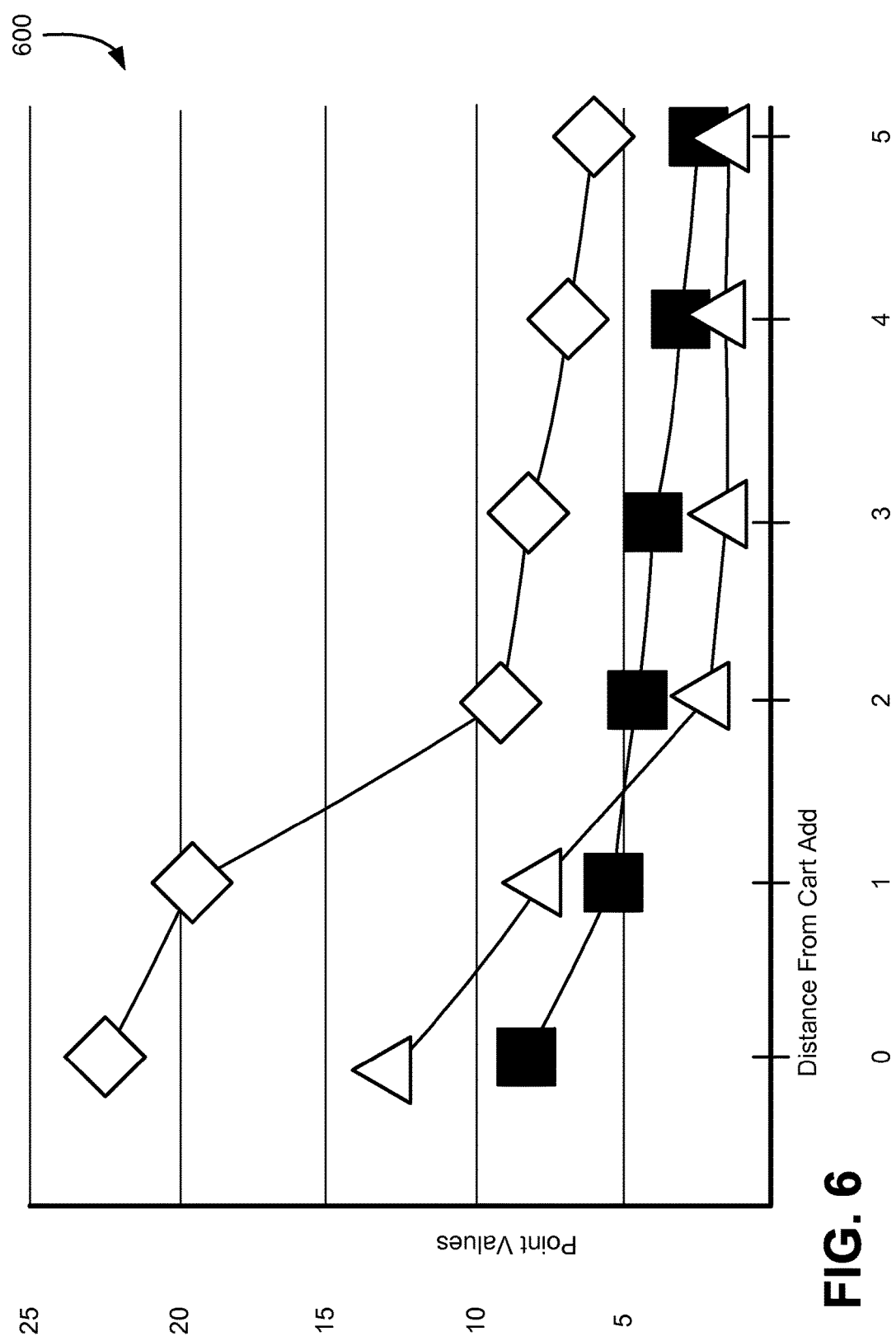
FIG. 6 shows a diagram illustration attribution analysis in accordance with various aspects of the present disclosure.

FIG. 6 is a graphical representation of using a statistical approach to assigning value to eligible hits. For example, the probability of a success event happening immediately after any $n^{th}$ hit in a customer browsing session, where n>1, may be described with the following equation:

$$P(a_n) = P(a_n|h_n) * P(h_n|h_{n-1}) * P(h_{n-1}|h_{n-2}) * P(h_{n-2}|h_{n-3}) * \ldots * P(h_2|h_1)$$

Where $P(a_n|h_n)$ denotes the probability of a success event happening immediately after the $n^{th}$ hit given that the session has at least n hits, and $P(h_n|h_{n-1})$ denotes the probability that the customer browsing session will have an $n^{th}$ hit given that the customer browsing session has at least n−1 hits. Each of the probabilities used to determine $P(a_n)$ may be modeled with one or more logistic regressions, for example:

Success Event model: $\text{logit}(P(a_i|h_i)) = \beta_0 + \beta_1 H_1 + \ldots + \beta_i H_i$ Continuance model: $\text{logit}(P(h_i|h_{i-1})) = \gamma_0 + \gamma_1 H_1 + \ldots + \gamma_{i-1} H_{i-1}$ Where $H_j$, represents the hit classification of the $j^{th}$ hit in the customer browsing session. In various embodiments, each $\beta_j H_j$ is expanded to $\beta_{Gj} H_{Gj} + \beta_{Nj} H_{Nj} + \beta_{Dj} H_{Dj} + \beta_{Ej} H_{Ej} + \beta_{Oj} H_{Oj}$, where the subscripts for G, N, D, E and O correspond to particular hit classifications such as an advertisement, a detailed description page corresponding to an item, an expanded view of an item, a review page corresponding to an item or any other content on the online retailer's website that may be classified. Furthermore, the H variables may be binary indicators, for example, 1 indicates a particular hit was of that particular hit classification and 0 indicates it was not. The same expansion may be made for the gamma coefficients. Under this model, a $j^{th}$ hit with a 0 value for all hit classes represents a non-shopping hit.

Figure 7:
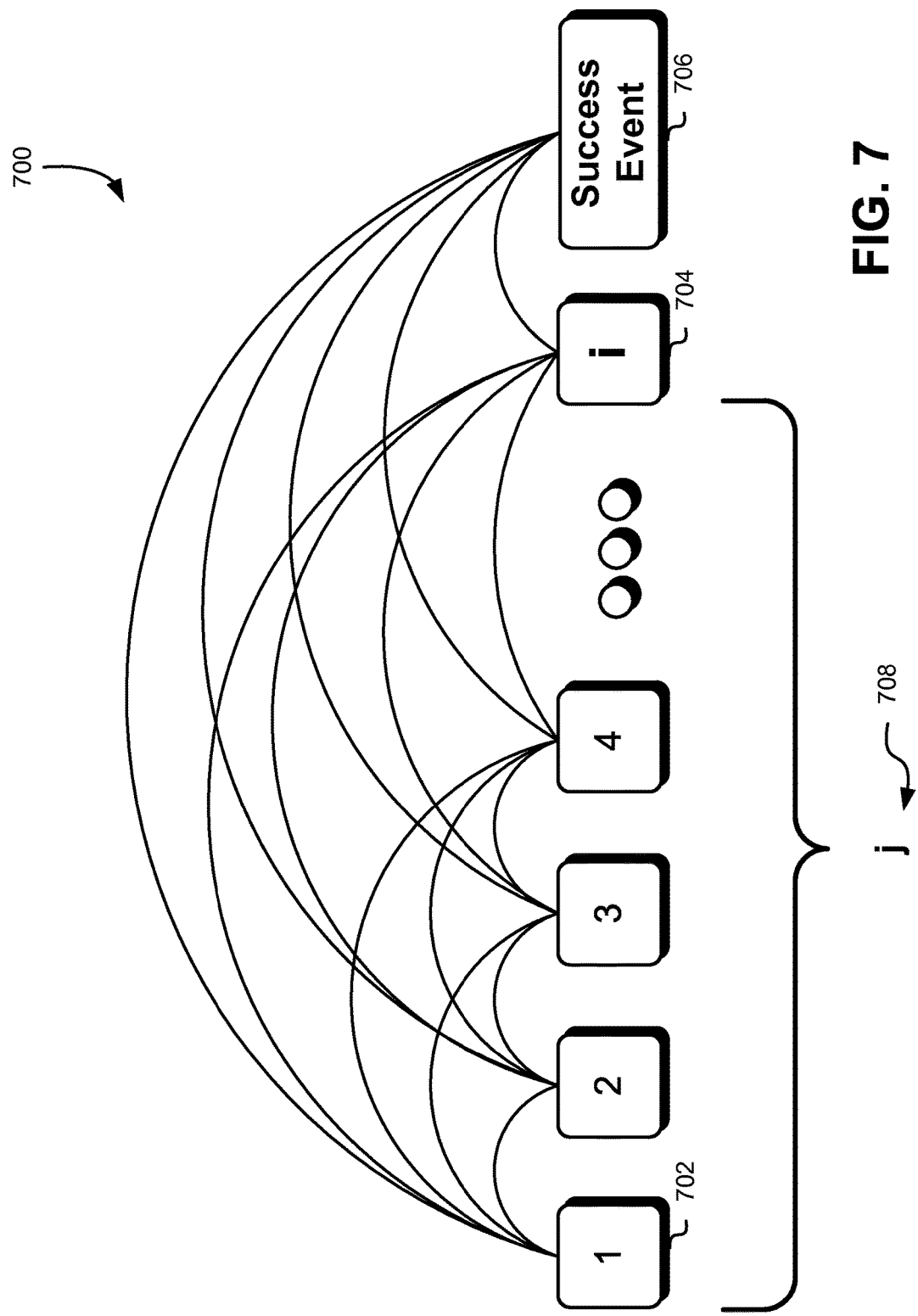
FIG. 7 shows a diagram illustration attribution analysis in accordance with various aspects of the present disclosure.

FIG. 7 shows diagram 700 illustrating the influence each successive eligible hit 702 may have on subsequent eligible hits and the success event 706. The hit classification of each $j^{th}$ hit 708 has the potential to influence the likelihood of a success event at a subsequent hit i 704, as well as the likelihood of each eligible hit occurring between the $j^{th}$ hit 708 and i 704. The probability $P(a_n)$ may be estimated using a combination of n regression models, for example, one success event model and n−1 continuance models. For each model, the estimated probability increase associated with each hit classification at each previous eligible hit i704 in the customer browsing session may be calculated. The estimated probability increase may be calculated by averaging the predicted probabilities where all values of $H_i$ are 0 (e.g., indicating that the eligible hit is not of the particular hit classification), and then for each hit classification, averaging the probabilities obtained if the values $H_i$ were changed to equal 1. The resultant probabilities may be divided by the original average to get the percentage increase, and the percentage increases from the $i^{th}$ hit 704 across each of the n models may be multiplied to get the combined effect.

This process may be repeated to calculate the combined percentage increase for each eligible hit in order to calculate the final average estimate. The combined percentage increase for each eligible hit may be calculated by repeating the same process as above but substituting k for i, where k is the distance from eligible hit n. When this process is repeated for multiple values of n, multiple estimates for the combined percentage increase for each value of k are calculated which may be used to calculate a final average estimate. The estimate probability calculation for each hit classification constitutes attribution decay curves that may be used to assign attribution values to eligible hits for each classification.

Figure 8:
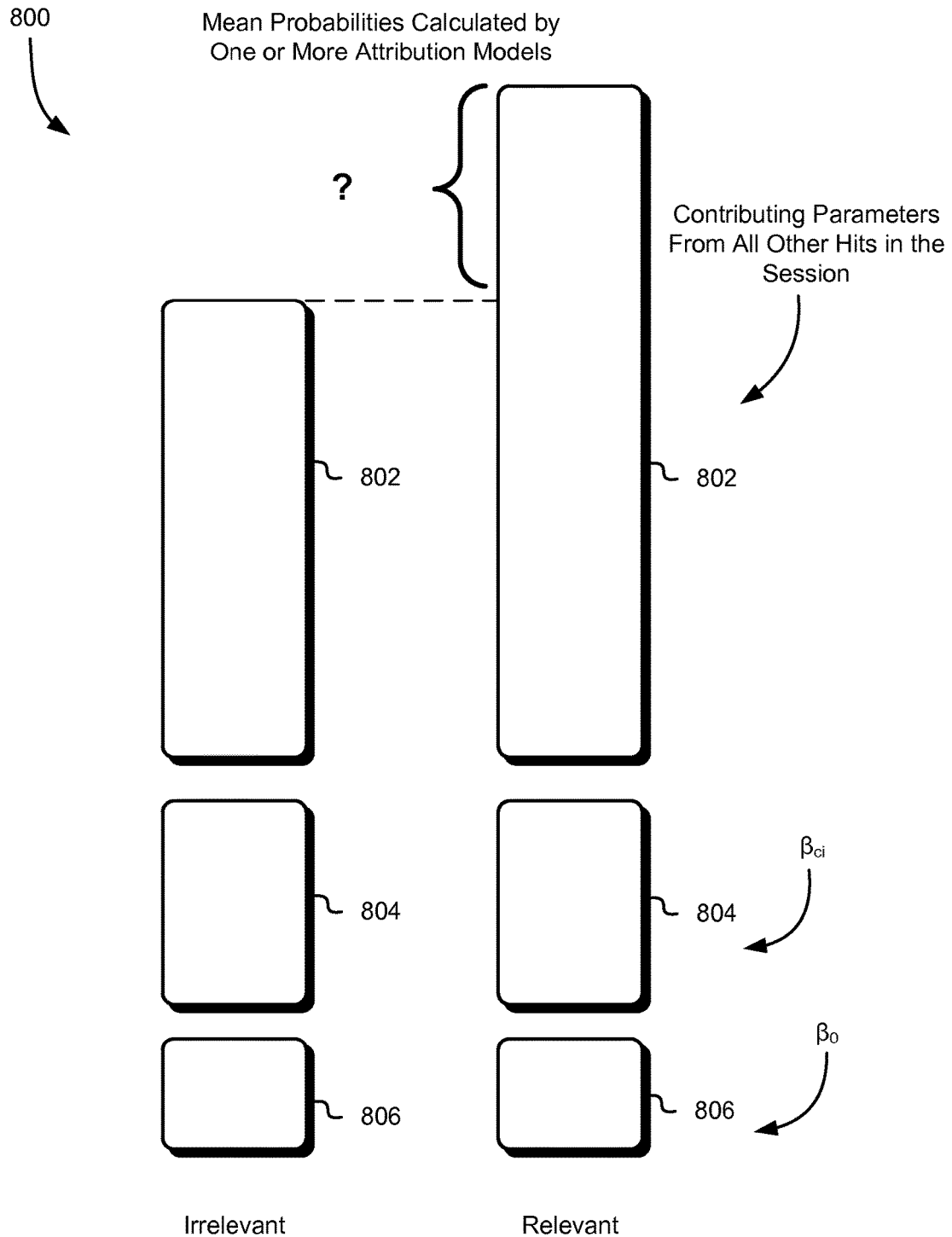
FIG. 8 shows a diagram illustration attribution analysis in accordance with various aspects of the present disclosure.

FIG. 8 shows a diagram 800 illustrating a relevance calculation for eligible hits in a hit classification, such as when calculating the influence of an eligible hit on subsequent eligible hits or a success event using one or more regression models. For example, the structure of the success event model may not be able to account for relevance because eligible hits in the customer browsing sessions that do not end in a success event do not have a success event by which to judge relevance when used as an input into the model. Therefore, at least a portion of the influence of the relevance of each eligible hit $H_i$ has been absorbed by one or more other variables. For example, if a relevant content hit at a distance of 5 from the success event was associated with a greater number of subsequent content hits, the influence of the relevance of that content hit would be distributed within the success event model amount of the other content hits.

Returning to FIG. 8, diagram 800 shows two sets of bars representing the mean probabilities calculated by a particular model for eligible hit i of hit classification c. The contributing parameters from all other eligible hits in the customer browsing session 802, the $\beta_{ci}$ 804 and the $\beta_0$ (e.g., the intercept) 806 may be used to determine relevance. In order to determine relevance and estimate the effect, first by selecting a customer browsing session that ends in a success event and then comparing to the calculated probabilities from the success event model between the relevant and irrelevant eligible hits, controlling for hit classification and eligible hit position within the customer browsing session. Among the customer browsing sessions with a success event, the attribution service may determine for each eligible hit that is associated with a single success event the nearest subsequent success event for which it is relevant.

Using the same variable n as before, those customer browsing sessions with a success event immediately after hit n may be isolated and scored using the outputs of the success event model in order to determine a predicted probability of a success event immediately after hit n. A list of variables may then be generated such that the variable indicates whether each eligible hit up through n was relevant to the success event. Each eligible hit is again represented by its distance k from the success event, ranging from 0 through 1-n, as well as by its hit class c.

In an embodiment, for each combination of n, k and c, the percentage deflation or inflation caused by the absence of relevance from the attribution model is calculated as shown below:

$$\text{Relevance deflation} = \frac{(\overline{P}_R - \overline{P})}{\overline{P}}$$

$$\text{Irrelevance inflation} = \frac{(\overline{P}_I - \overline{P})}{\overline{P}}$$

Where $\overline{P}_R$ is the mean predicted probability among relevant eligible hits, $\overline{P}_I$ is the mean predicted probability among irrelevant eligible hits, and $\overline{P}$ is the mean predicted probability among the pooled relevant and irrelevant hits. In various embodiments, both the inflation and deflation values could be either positive or negative. The relevance deflation and irrelevance inflation may be calculated for a variety of different values for n, then the attribution service may calculate an average of the relevance deflation and irrelevance inflation estimates for each combination of hit classification and distance from the success events, weighted by the total number of customer browsing sessions ending in a success event used in the calculations. For each curve, the average relevance deflation and irrelevance inflation may be subtracted from the corresponding values in the curves thereby generating two new curves—a relevance curve and an irrelevance curve. For example, assuming there is a curve for the glance views, for one particular hit classification each of the glance views may turn into two curves (one for relevance hits and one for irrelevance hits). The glance views may be a set of eligible hits corresponding to one or more customers navigating to a particular webpage of the electronic commerce marketplace containing only basic information about a product, such as name and price.

Figure 9:
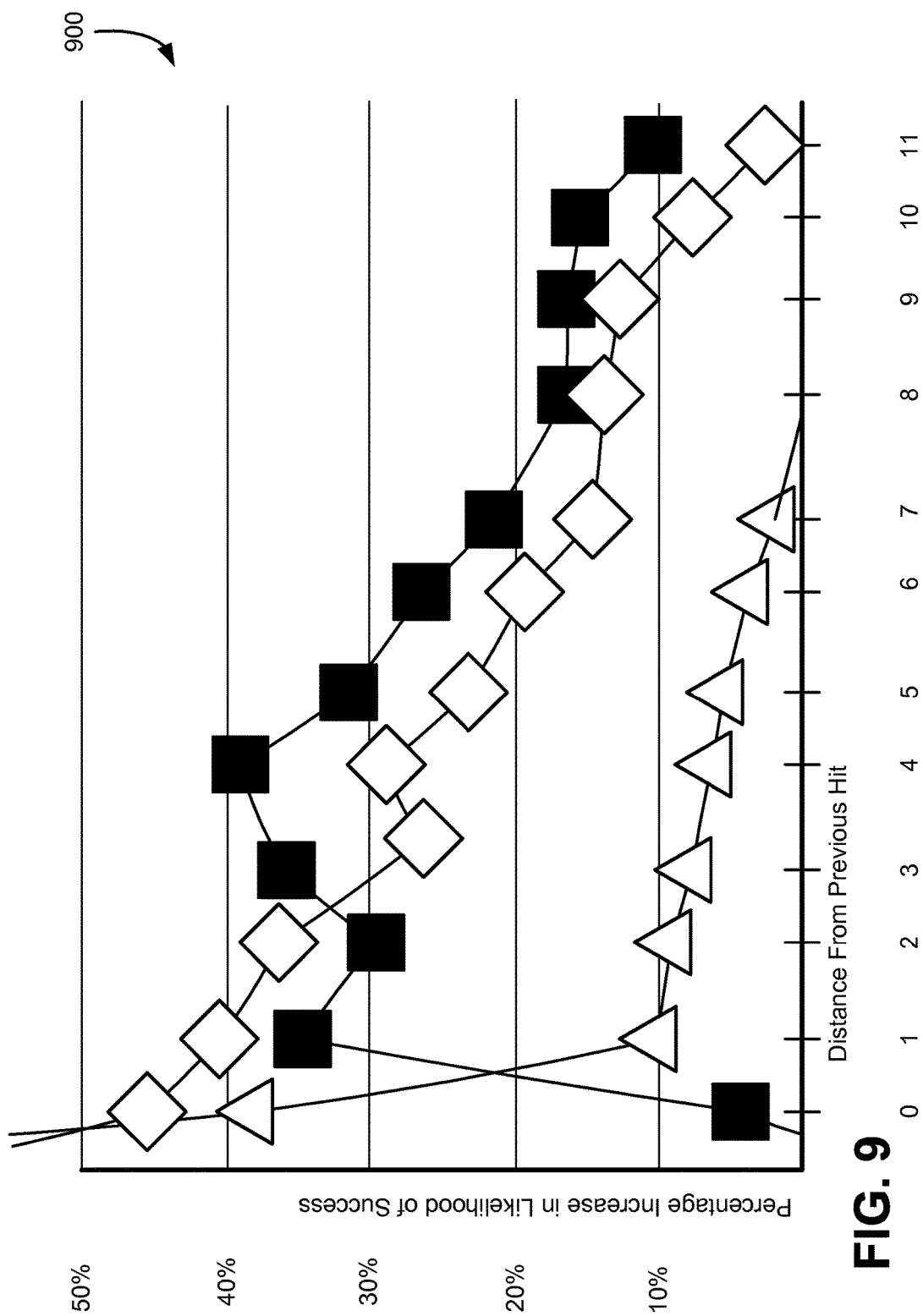
FIG. 9 shows a diagram illustration attribution analysis in accordance with various aspects of the present disclosure.

FIG. 9 shows a diagram 900 illustrating the plotting of the one or more curves based at least in part on the one or more regression models used to determine the attributed values for one or more eligible hits. The one or more curves may be plotted and the magnitudes of the estimated probability effects may constitute a point system of the attributed values, where for each success event in a customer browsing session, the hit classification and distance for each previous hit is assigned the corresponding point value based at least in part on the plotted curves based at least in part on the one or more regression models. The probability of a success event at various hit distances is the magnitude of the plotted curves. In various embodiments, the one or more curves are adjusted based at least in part on business logic before attribution values are assigned. For example, the curves based at least in part on the one or more regression models may be smoothed by selecting an integer value such that when the integer value multiplied by the percentage value at each hit the result is a monotonic curve. In another example, negative attributed values may be reset to zero in order to prevent the content delivery service from penalizing content with a negative attributed value. Attributed values may also be capped so that the influence of content is not overattributed. To account for success event occurring at distance zero the attribution value may be set to the nearest non-negative value. In order to avoid over attributing content due to multiple content hits for that same content, a maximum attributed value for the content may be determined and this maximum value may be attributed to one of the content hits of the multiple content hits. A maximum attributed value may also be assigned to content that is determined to be the first discovery of the item purchased.

Figure 10:
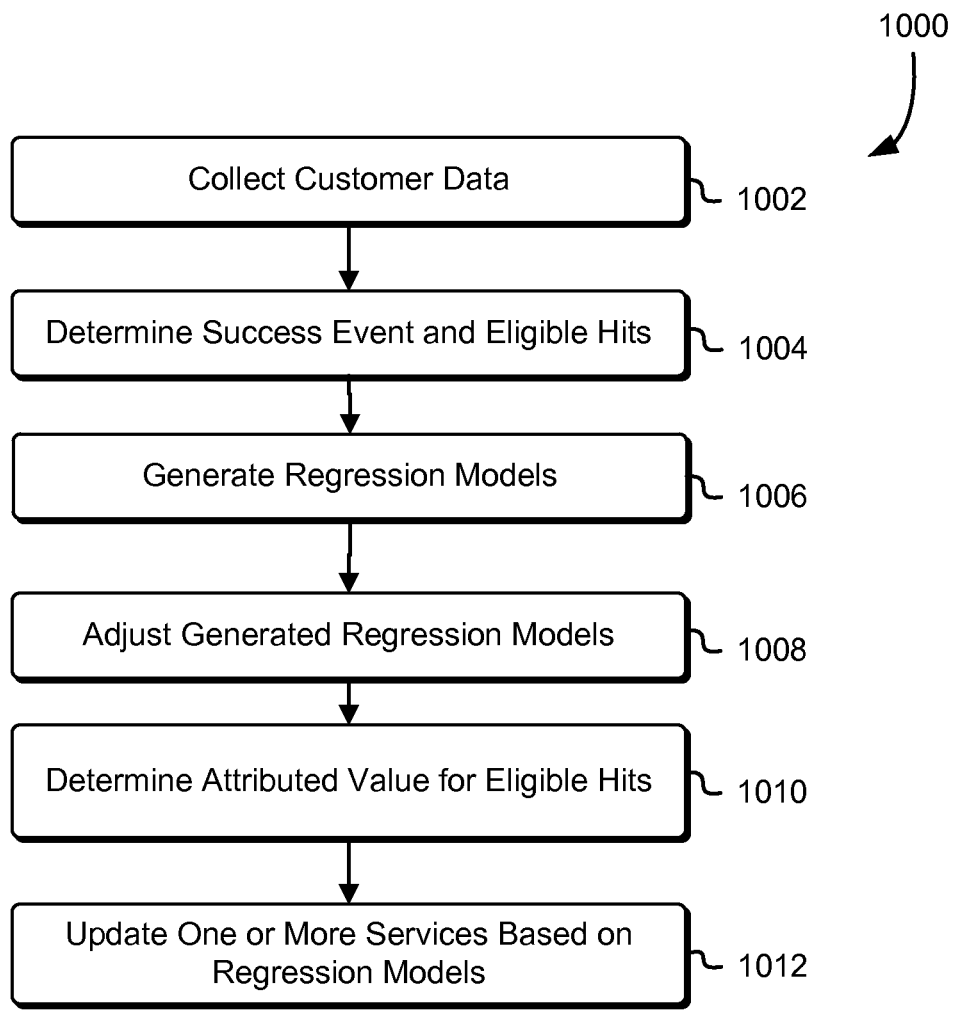
FIG. 10 shows an illustrative example of a process for attributing values to hits on a website in accordance with at least one embodiment.

FIG. 10 shows an illustrative example of process 1000 which may be used to generate one or more regression models used to calculate the attributed value for one or more eligible hits. The process 1000 may be performed by any suitable system such as the attribution service 312, described above in connection to FIG. 3. Returning to FIG. 10, in an embodiment, the process 1000 includes collecting customer data 1002. The customer data may include clickstream data collected by the stream processing service described above in connection with FIG. 3 during a customer's browsing session. The collected customer data 1002, may include data corresponding to a customer's profile or account with the online retailer.

The collected customer data 1002 may then be used to determine one or more success events and associated eligible hits 1004. Based at least in part on the determined success events and eligible hits 1004, one or more regression models may be generated 1006. Generating 1006 the regression models may be performed by solving the equation described above in connection with FIG. 5 for omega. Generating 1006 the regression models may include factoring out relevant inflation and irrelevant deflation, such as described above in connection with FIG. 8, thereby generating at least two other regression models. The regression models may then be adjusted 1008 based at least in part on business logic. The attributed values for eligible hits may be determined 1010 based at least in part on the one or more generated 1006 regression models. The attributed values for the eligible hits may be determined 1010 by plotting the one or more regression models and assigning the attribution values based at least in part on the magnitude of the plotted regression models at the corresponding hit location, such as described above in connection with FIG. 9. The determined 1010 attributed values for eligible hits may then be transmitted to one or more other services of the online retailer in order to update the services based at least in part on the regression models 1012. For example, the attributed values may be transmitted to the content delivery service to be used to optimize content on the electronic commerce website, such as described above in connection with FIG. 3.

Figure 11:
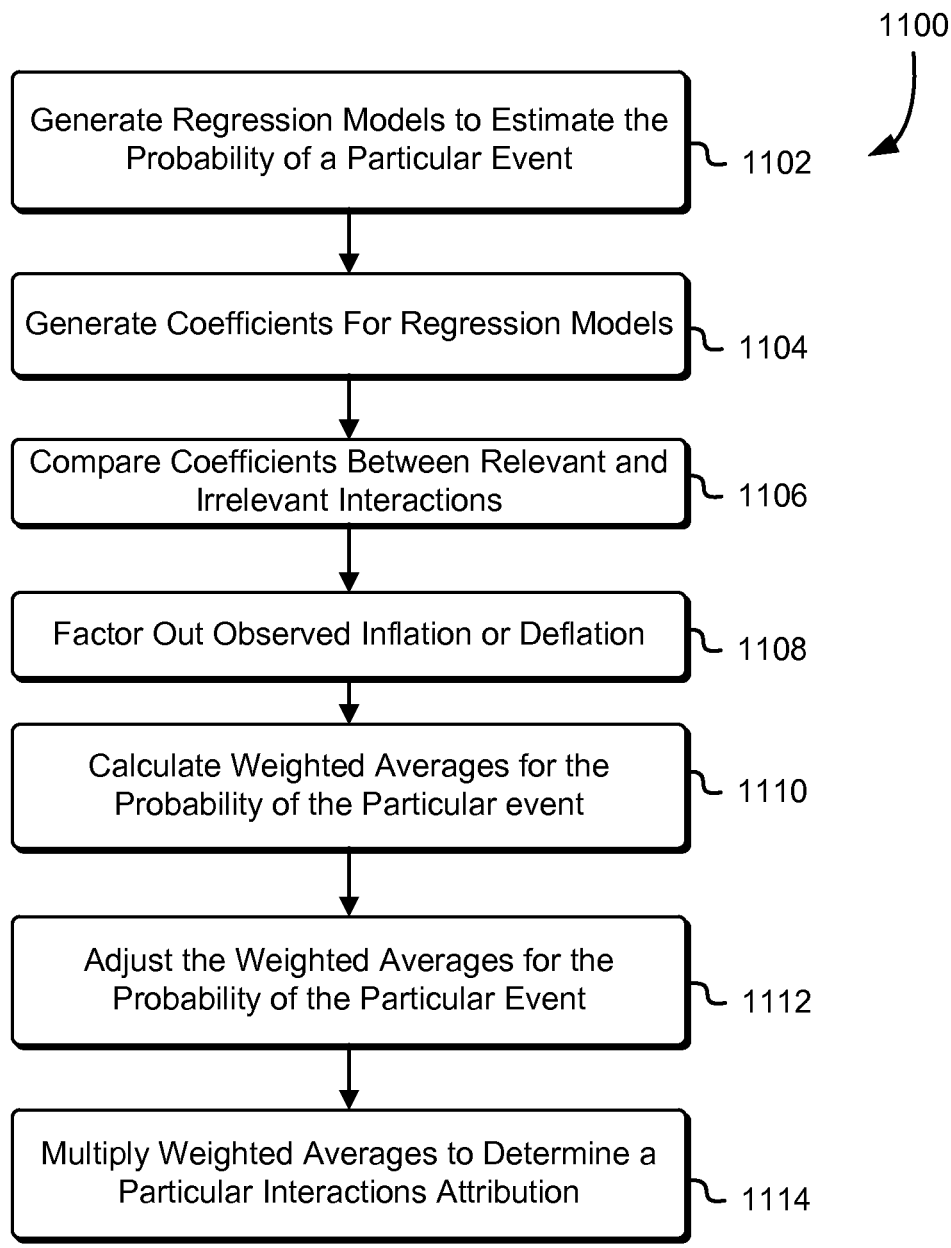
FIG. 11 shows an illustrative example of a process for attribution analysis in accordance with at least one embodiment.

FIG. 11 shows an illustrative example of process 1100 which may be used to optimize various regression models in order to improve the calculated attributed value for one or more eligible hits. The process 1100 may be performed by any suitable system such as the attribution service 312, described above in connection to FIG. 3. Returning to FIG. 11, in an embodiment, the process 1100 includes generating a regression model which may be used to calculate the probability of a particular event given a particular interaction 1102. For example, the regression model may be used to calculate the probability of a cart-add based on a customer clicking on or otherwise selecting a particular piece of content on the electronic commerce website. The attribution service may then calculate coefficients for the regression model 1104. Calculating the coefficients for the regression model 1104 may be performed by solving the equation described in connection with FIG. 5 for omega. Based at least in part on the generated coefficients, the coefficients of the relevant and irrelevant eligible hits may be compared 1106 as described above in connection with FIG. 8 in order to factor for relevance in the regression models.

Based at least in part on the compared coefficients 1106, the observed inflation and deflation may be factored out of the regression models 1108. Factoring out the inflation and deflation from the regression models 1108 may include subtracting the corresponding coefficients thereby generating new regression models which may be used to calculate weighted averages for the probability of a particular event 1110, such as an eligible hit or success event. Calculating the weighted averages for the probability of a particular event 1112 may be performed by solving for $P(a_n)$, such as described above in connection with FIG. 6. The weighted averages may then by multiplied in order to determine the attribution value for the particular event 1112.

Figure 12:
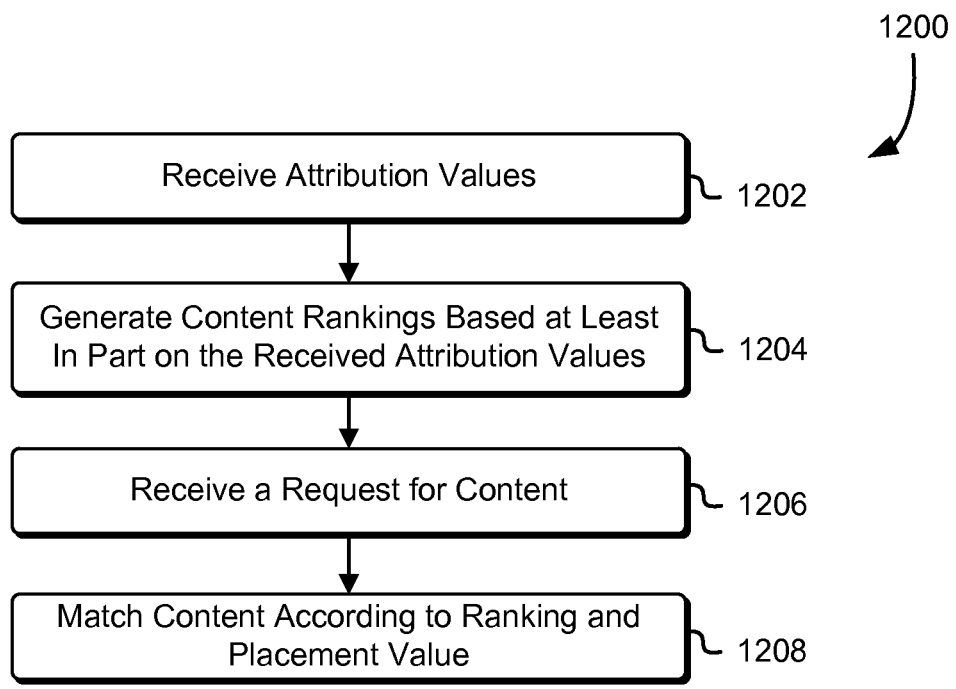
FIG. 12 shows an illustrative example of a process for using attribution values in accordance with at least one embodiment.

FIG. 12 shows an illustrative example of process 1200 which may be used to optimize content on an electronic commerce website based at least in part on attributed values calculated by one or more services of the online retailer. The process 1200 may be performed by any suitable system such as the content delivery service 306, described above in connection to FIG. 3. Returning to FIG. 12, in an embodiment the process 1200 includes receiving attribution values 1202 where the attribution values correspond to the value added for a particular piece content. The attribution values may be assigned by the attribution service, in order to determine the attribution values the attribution service may generate one or more regression models that when plotted provide the influence, in terms of percentage of the total influence on the customer, a piece of content may have. When the percentage of the total influence of a piece of content multiplied by the total value of a success event, the result may be the attribution value assigned to the content, such as described above in connection with FIG. 5. The content delivery service may then generate content rankings based at least in part on the received attribution values 1204. The content delivery service may use the received attribution values as inputs into one or more algorithms in order to generate content rankings, such as described above in connection with FIG. 4.

At some point later, the content delivery service may receive a request for content 1206 to be displayed on the electronic commerce website. For example, a customer may navigate to the electronic commerce website and one or more servers of the electronic commerce website may receive an appropriately configured HTTP request. As a result, the one or more servers may transmit an appropriately configured API request to the content delivery service for content to be rendered and displayed to the customer navigating the electronic commerce website. The content delivery service may then match content according to the generated content ranking and the placement value 1208. The selection of content may be performed by using one or more algorithms to determine the highest ranking content for display on the online retailer's website, such as described above in connection with FIG. 4. For example, the content delivery service may match the highest ranking content with the most prominent placement on the electronic commerce website.

Figure 13:
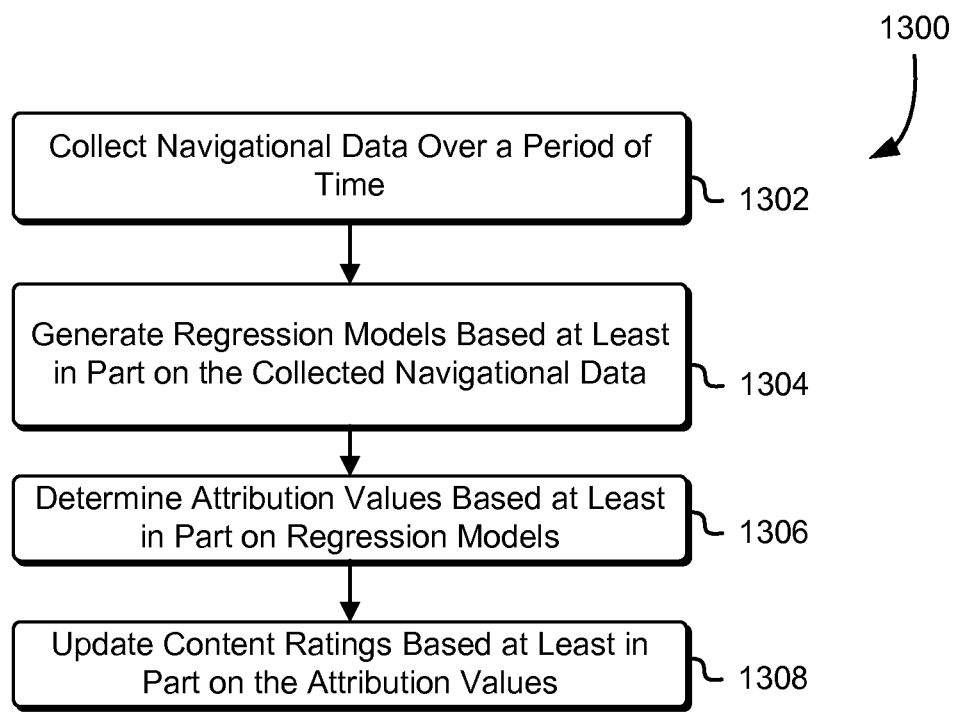
FIG. 13 shows an illustrative example of a process for generating attribution values in accordance with at least one embodiment.

FIG. 13 shows an illustrative example of process 1300 which may be used generate attribution values for content on an electronic commerce marketplace based at least in part on one or more regression models. The process 1300 may be performed by any suitable system such as the attribution service 312, described above in connection to FIG. 3. In an embodiment the process 1300 includes collecting navigational data over a period of time 1302. The navigational data may be collected by the stream processing service described below in connection with FIG. 3. The navigational data may be clickstream data or other data representing a customer's interaction with the electronic commerce marketplace. For example, the navigational data may be browser history collected from a customer web browser during one or more interactions with the electronic commerce marketplace. The navigational data may be collected over a period of time from one or more customers' interactions with the electronic commerce marketplace. For example, the navigational data may be collected for a period of fourteen days. The navigation data may also be collected continuously and grouped in to specific time periods. For example, the navigational data may be grouped such that the navigational data collected over a four week period is grouped together. The navigational data may be organized and/or collected by the stream processing service or one or more other services of the online retailer.

The navigational data for a particular period may be transmitted to the attribution service and used to generate one or more regression models based at least in part on the navigational data 1304. A set of eligible hits and success events may be determined from the navigational data and used as inputs into the one or more regression models as described above in connection with FIG. 6. The attribution service may then determine one or more attribution values for content based at least in part on the one or more regression models as described above in connection with FIG. 5. The attribution service may then store the calculated attribution values in one or more storage systems, such as the data store described above in connection with FIG. 3, or the attribution service may transmit the attribution values to one or more other services of the online retailers, such as the content delivery service described above in connection with FIG. 4.

The content delivery service or one or more other services of the online retailer may then update content rating based at least in part on the attribution values 1308. For example, the determined attribution values may be transmitted to the content delivery service and the content delivery service may assign ratings to content on the electronic commerce marketplace based at least in part on the attributed values. The content rating may be used to determine the content and placement of content on the electronic commerce marketplace as described above in connection to FIG. 2. Numerous variations of process 1300 may be used in accordance with the present disclosure. For example, process 1300 may be repeated periodically in order to update the attribution values assigned to content on the electronic commerce marketplace. For example, navigational data may be collected every thirty days and used as an input to one or more regression models in order to determine attribution values for content. The attribution values may then be transmitted to the content delivery service and used to update the content ratings. Process 1300 may also be configured to collect navigational data, determine the corresponding eligible hit events and success events and calculate new attribution values as the navigational data is collected. For example, the stream processing service may collect the navigational data and near contemporaneously with collecting the navigational data, input the data into the one or more regression models in order to determine attribution values for content on the electronic commerce marketplace and transmit the calculated attribution values to the content delivery service.

Figure 14:
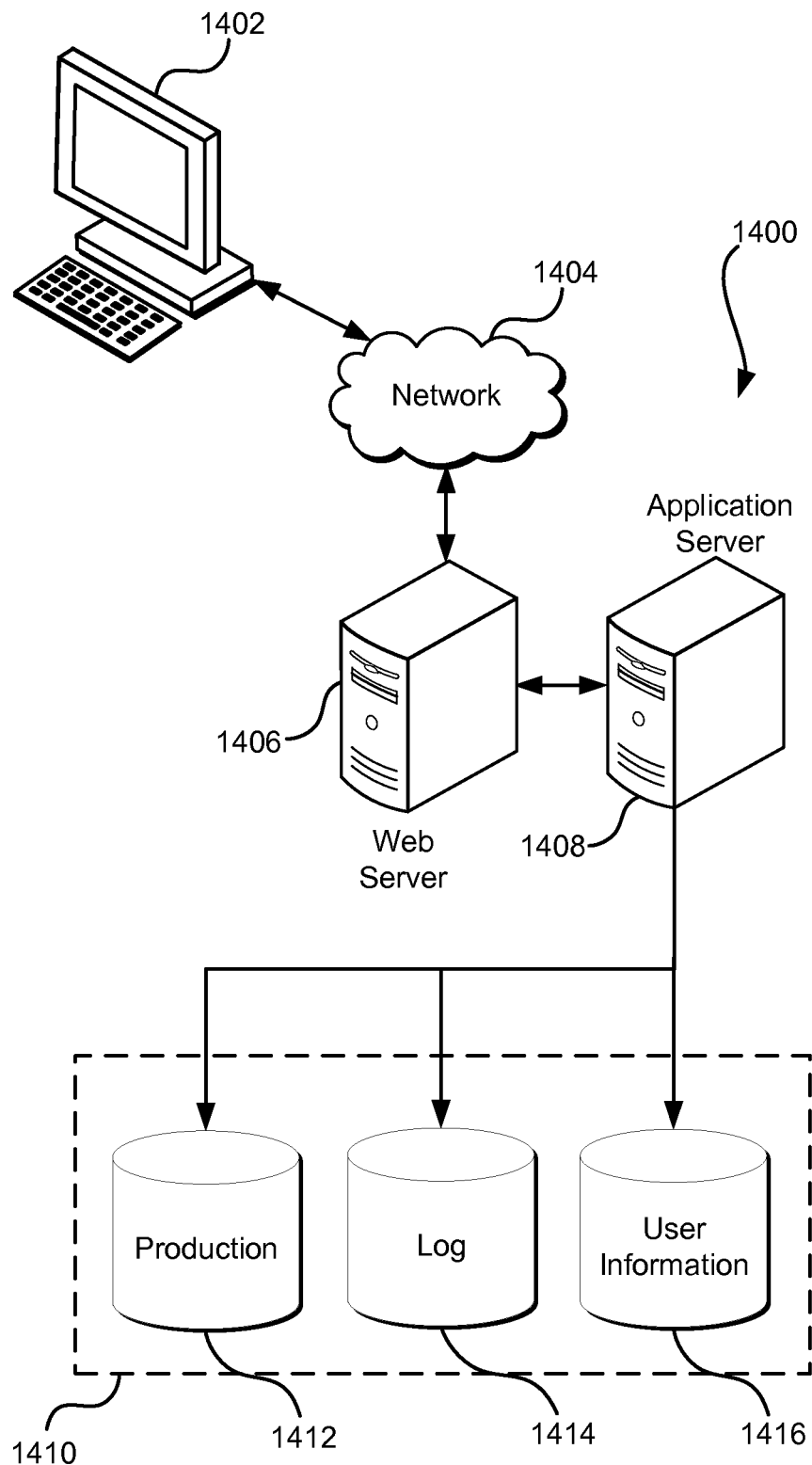
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1402 and the application server 1408, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
under the control of a computer system including one or more processors that execute instructions,
collecting data associated with one or more users' interaction with content on an electronic commerce website operated by an online retailer;
determining one or more cart-add events and one or more eligible hit events;
calculating an attributed value for a set of eligible hit events based at least in part on the one or more eligible hit events and a particular cart-add event of the one or more cart-add events associated with the one or more eligible hit events by at least:
generating a set of groups including the one or more eligible hit events based at least in part on a set of hit classifications indicating attributes of the one or more eligible hit events corresponding to particular groups of the set of groups;
generating, based at least in part on a probability of a particular eligible hit included in a particular group of the set of groups associated with the particular cart-add event given at least one prior eligible hit event, a set of regression models, wherein at least one regression model of the set of regression models is based at least in part on a different hit classification than a hit classification associated with the particular group;
adjusting one or more coefficients corresponding to the set of regression models such that the one or more coefficients cause a set of attributed values determined based at least in part on the set of regression models to be modified based at least in part on information associated with the one or more cart-add events and the one or more eligible hit events, where members of the set of attributed values express an amount of attributed points associated with a particular eligible hit event of the set of eligible hit events based at least in part on a coefficient of one or more coefficients associated with the particular eligible hit event; and
determining at least one regression model to be used to calculate the attributed value for the set of eligible hit events based at least in part on a comparison of at least a subset of the set of regression models; and
updating a content delivery service responsible for selecting content for the electronic commerce website based at least in part on the at least one regression model.

2. The computer-implemented method of claim 1, wherein the data associated with one or more users' interaction includes clickstream data corresponding to user clicks during navigation of the electronic commerce website.

3. The computer-implemented method of claim 1, wherein adjusting the one or more coefficients corresponding to the set of regression models includes determining relevance deflation and irrelevance inflation from at least a subset of the regression model in order to remove an effect of the relevance deflation and irrelevance inflation.

4. The computer-implemented method of claim 1, wherein the computer-implemented method further includes selecting content for the electronic commerce website based at least in part on the attributed value.

5. The computer-implemented method of claim 4, wherein selecting content for the electronic commerce website includes selecting content with a higher attributed value over content with a lower attributed value.

6. The computer-implemented method of claim 1, wherein the computer-implemented method further includes removing content from the electronic commerce website operated by the online retailer based at least in part on the attributed value associated with the content being below a threshold value.

7. A system, comprising:
at least one computing device that implements one or more services, wherein the one or more services:
determine a set of hits and a set of success events based at least in part on a set of data collected from one or more users' interaction with an electronic commerce marketplace;
group the set of hits into a set of groups based at least in part on hit classification associated with a particular group of the set of groups;
generate, based at least in part on the set of groups and the set of success events, a set of regression models;
adjust at least a subset of the set of regression models by at least modifying a coefficient of the subset of the set of regression models based at least in part on one or more influences on the one or more users' interactions;
assign attribution values to at least a subset of the set of hits based at least in part on the subset of the set of regression models, where the coefficient modifies an assigned attribution value of a particular hit of the set of hits; and
store the assigned attribution values, such that the stored attribution values are usable to determine content for the electronic commerce marketplace.

8. The system of claim 7, wherein the one or more services determine at least one piece of content for the electronic commerce marketplace based at least in part on the stored attribution values.

9. The system of claim 7, wherein the one or more services update a content delivery service based at least in part on the assigned attribution values.

10. The system of claim 7, wherein the data corresponding to one or more users' interaction with the electronic commerce marketplace includes clickstream data.

11. The system of claim 7, wherein adjusting at least the subset of the set of regression models includes smoothing the subset of the set of regression models such that corresponding regression curves are monotonic.

12. The system of claim 7, wherein adjusting at least the subset of the set of regression models is performed in accordance with one or more caps set for the regression models such that attribution values corresponding to the regression models have a maximum attribution value.

13. The system of claim 12, wherein the one or more services:
determine first discovery of an item purchased as a result of at least one success event of the set of success events; and
assign the maximum attribution value to a particular hit corresponding to the first discovery.

14. A non-transitory computer-readable storage medium having collectively stored thereon executable instructions that, if executed by one or more processors of a computer system, cause the computer system to at least:

collect data corresponding to navigational hits on content served by one or more servers;

generate a set of groups of the navigational hits based at least in part on a set of hit classifications, where at least one group of the set of groups is associated with at least one hit classification of the set of hit classifications;

generate, based at least in part on a particular group of the set of groups, a regression model useable for determining a probability of a success event given one or more navigational hits on an instance of content included in the particular group;

modify a coefficient of the regression model based at least in part on an attribute of navigational hits;

determine attribution values for the instance of content based at least in part on the regression model and a specified value of the success event, where the coefficient modifies at least one attribution value for the instance of content; and update a content delivery service based at least in part on the attribution values.

15. The non-transitory computer-readable storage medium of claim 14, wherein the data corresponding to navigational hits on content comprises clickstream data.

16. The non-transitory computer-readable storage medium of claim 14, wherein the instructions further comprise instructions that, if executed by the one or more processors, cause the computer system to select content to be served by the one or more servers based at least in part on the attribution values.

17. The non-transitory computer-readable storage medium of claim 14, wherein the instructions further comprise instructions that, if executed by the one or more processors, cause the computer system to adjust the regression model to remove an effect of one or more coefficients in the regression model.

18. The non-transitory computer-readable storage medium of claim 17, wherein the instructions that cause the computer system to adjust the regression model further include instructions that cause the computer system to adjust the regression model for relevance corresponding to one or more coefficients of the regression model.

19. The non-transitory computer-readable storage medium of claim 14, wherein the instructions further comprise instructions that, if executed by the one or more processors, cause the computer system to provide for display, in response to a command from a user, the attribution values.

20. The non-transitory computer-readable storage medium of claim 19, wherein the instructions further comprise instructions that, if executed by the one or more processors, cause the computer system to receive from the user an update promoting content to be served by the one or more servers based at least in part on the attribution value corresponding to the content.

\* \* \* \* \*